US007058502B2

(12) United States Patent
Rodgers

(10) Patent No.: US 7,058,502 B2
(45) Date of Patent: Jun. 6, 2006

(54) TORQUE SPEED CONTROL AUTHORITY FOR AN ENGINE HAVING AN ALL-SPEED GOVERNOR

(75) Inventor: David V. Rodgers, Bloomingdale, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 131 days.

(21) Appl. No.: 10/718,190

(22) Filed: Nov. 20, 2003

(65) Prior Publication Data

US 2005/0114002 A1 May 26, 2005

(51) Int. Cl.
*G06F 7/00* (2006.01)

(52) U.S. Cl. ................ 701/104; 123/339.16; 123/357; 123/396

(58) Field of Classification Search ................ 701/104, 701/103, 109, 112; 123/480, 436, 672, 696, 123/339.16, 339.17, 339.18, 357, 396
See application file for complete search history.

(56) References Cited

U.S. PATENT DOCUMENTS 5,553,589 A * 9/1996 Middleton et al. .......... 123/352
6,016,459 A * 1/2000 Isaac et al. ................ 701/102
6,085,725 A * 7/2000 Goode et al. ............... 123/357
6,189,523 B1 * 2/2001 Weisbrod et al. ........... 123/672
6,854,523 B1 * 2/2005 Takahashi ..................... 172/3

* cited by examiner

*Primary Examiner*—Willis R. Wolfe
*Assistant Examiner*—Johnny H. Hoang
(74) *Attorney, Agent, or Firm*—Dennis Kelly Sullivan; Susan L. Lukasik; Jeffrey P. Calfa

(57) ABSTRACT

A motor vehicle (20) has a diesel engine (22) and one or more sources (30, 36) providing data relevant to operations of the vehicle that are external to the engine but potentially influential on fueling of the engine. An engine control system (24) processes data according to an all-speed governing strategy for controlling engine fueling to develop all-speed governed fueling data (MFGOV) that sets engine fueling when a data input to the engine control system from the one or more sources discloses no need to influence engine fueling. When the data input from such one or more sources discloses a need to influence engine fueling, that data input causes engine fueling to be set by a strategy other than the all-speed governing strategy, a torque speed control strategy (54) in particular.

46 Claims, 5 Drawing Sheets

TORQUE SPEED CONTROL AUTHORITY FOR AN ENGINE HAVING AN ALL-SPEED GOVERNOR

FIELD OF THE INVENTION

This invention relates generally to motor vehicle internal combustion engines that have all-speed governors. More specifically, the invention relates to engines, systems, and methods for control of fueling in such engines to avoid potential stalling when the action of a device, component, or system in a vehicle external to the engine, such as traction control, ABS, or the transmission, results in a torque request to an electronic engine control system that is different from the torque being requested by an all-speed governor strategy in the engine control system.

BACKGROUND OF THE INVENTION

A known electronic engine control system comprises a processor-based engine controller that processes data from various sources to develop control data for controlling certain functions of the engine. One function that is can be effectively controlled by a processor-based system is engine torque. Control of torque is accomplished by control of engine fueling. A processor-based control system processes certain data useful in setting a data value for engine fueling that will cause the engine to develop requested torque, and then uses the result of that processing to control fuel injectors that inject fuel into engine cylinders where the fuel is combusted to develop the requested torque.

A processor-based engine control system can endow a diesel engine with an electronic governor, one type of which is commonly known as an all-speed governor. In general, an all-speed governor functions in a manner such that for any given speed within a range of engine speeds, fuel will be injected into the cylinders in a proper amount to handle whatever torque is being requested at that speed within a range of allowable torque. As torque requests change while engine speed is held constant at a given speed, the engine control system adjusts fueling in a manner that strives to maintain that given speed.

A motor vehicle that is powered by such an engine may have certain devices, components, and/or systems whose influence on engine torque via influencing engine fueling may be desirable under certain conditions of vehicle operation, but unnecessary and/or undesirable in the absence of those conditions. Examples are the transmission during certain gearshifts, the ABS system during certain braking events, and the traction control system during certain traction control events. When such events are allowed to influence engine torque, it is important that they do so in appropriate ways. Of particular importance is the avoidance of changing fueling to an extent that is detrimental to engine and vehicle operation. For example, fueling should not be restricted to such an extent that the engine may stall.

SUMMARY OF THE INVENTION

Briefly, a general aspect of the present invention relates to an improvement for an all-speed-governed engine where authority is accorded to a torque speed control strategy to control engine fueling, and hence engine torque, on occasions when a device, component, or system that is external to the engine, indicates a need for torque speed control instead of all-speed governing.

Accordingly a generic aspect of the invention relates to an internal combustion engine having a fueling system for fueling the engine; one or more sources providing data relevant to operations of the apparatus that are external to the engine but potentially influential on fueling of the engine; and an engine control system comprising a processor for processing data according to an all-speed governing strategy for controlling the fueling system to develop all-speed governed fueling data that sets engine fueling when a data input to the engine control system from the one or more sources discloses no need to influence engine fueling, but when the data input from such one or more sources discloses a need to influence engine fueling, that data input causes engine fueling to be set by a strategy other than the all-speed governing strategy.

A specific example of the other strategy is a torque speed control.

Still other generic aspects relate to the control system just described and the method that is performed by the control in controlling the engine.

Still other generic aspects relate to motor vehicles having such engines and control systems.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENTS

Figure 1:
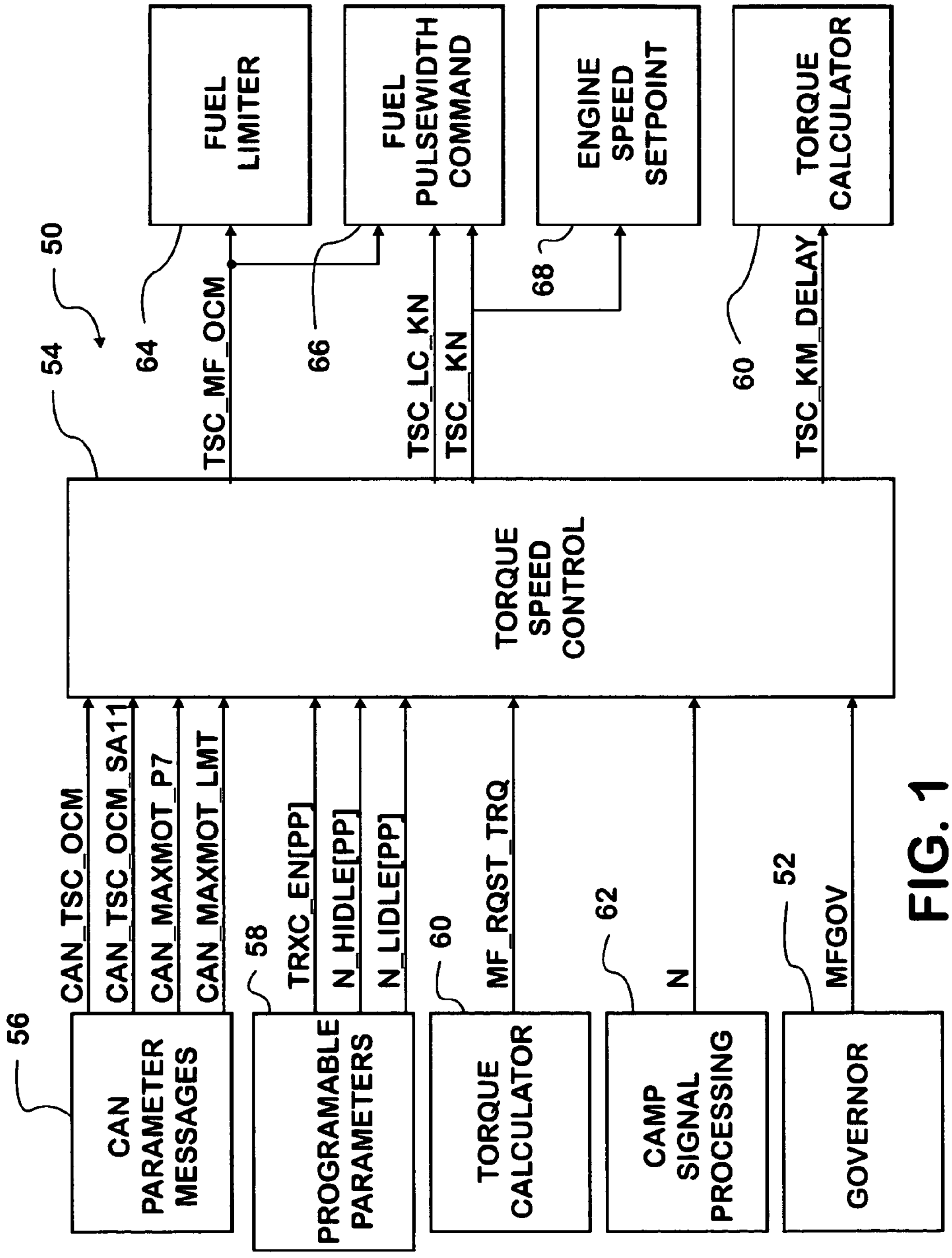
FIG. 1 is a general schematic block diagram of a portion of an exemplary processor-based engine control system in accordance with principles of the present invention.
Figure 1A:
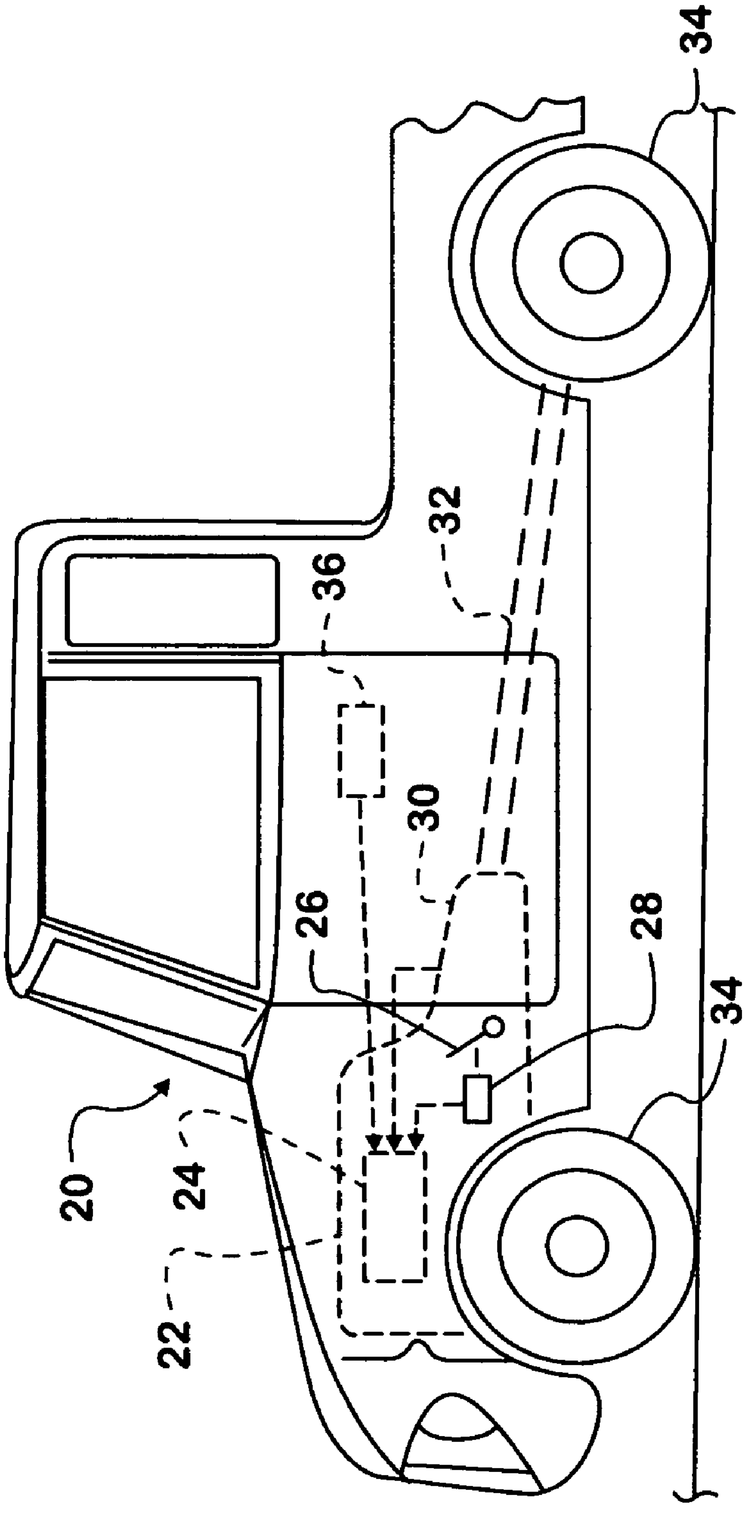
FIG. 1A illustrates a representative motor vehicle having the engine control system presented in FIG. 1.

FIG. 1 comprises a strategy interface 50 to illustrate how the inventive strategy interfaces with other portions of the engine control strategy in a processor-based engine control system and with certain devices, components, and/or systems that are external to the engine and engine control system in a motor vehicle propelled by the vehicle. An example of a vehicle that can benefit from the invention is a truck powered by a diesel engine, such as a turbocharged diesel engine. Examples of such devices, components, and/or systems are those mentioned earlier. FIG. 1A illustrates such a truck 20 comprising a diesel engine 22 having an engine control system 24. An accelerator pedal 26 operated by the driver acts on an accelerator position sensor (APS) 28 to provide a control input to control system 24. Truck 20 also comprises a transmission 30 having an input directly coupled to the engine output for propelling the vehicle through a drivetrain 32 ending at driven ones of the truck's wheels 34.

Truck 20 further comprises an ABS system 36 that acts on wheels 34 under certain conditions. ABS system 36 and transmission 30 provide certain inputs to engine control system 24 in accordance with principles of the invention. A traction control system can also provide an input when present.

The engine control system comprises an all-speed GOVERNOR strategy 52 that provides all-speed governing of the engine at times when those certain external devices, components and/or systems disclose no need to influence engine torque. However, when any one of such devices, components, and/or systems discloses such a need, the inventive strategy is enabled to act in ways that can override the all-speed governing strategy when conditions for overriding that strategy are present.

Figure 2:
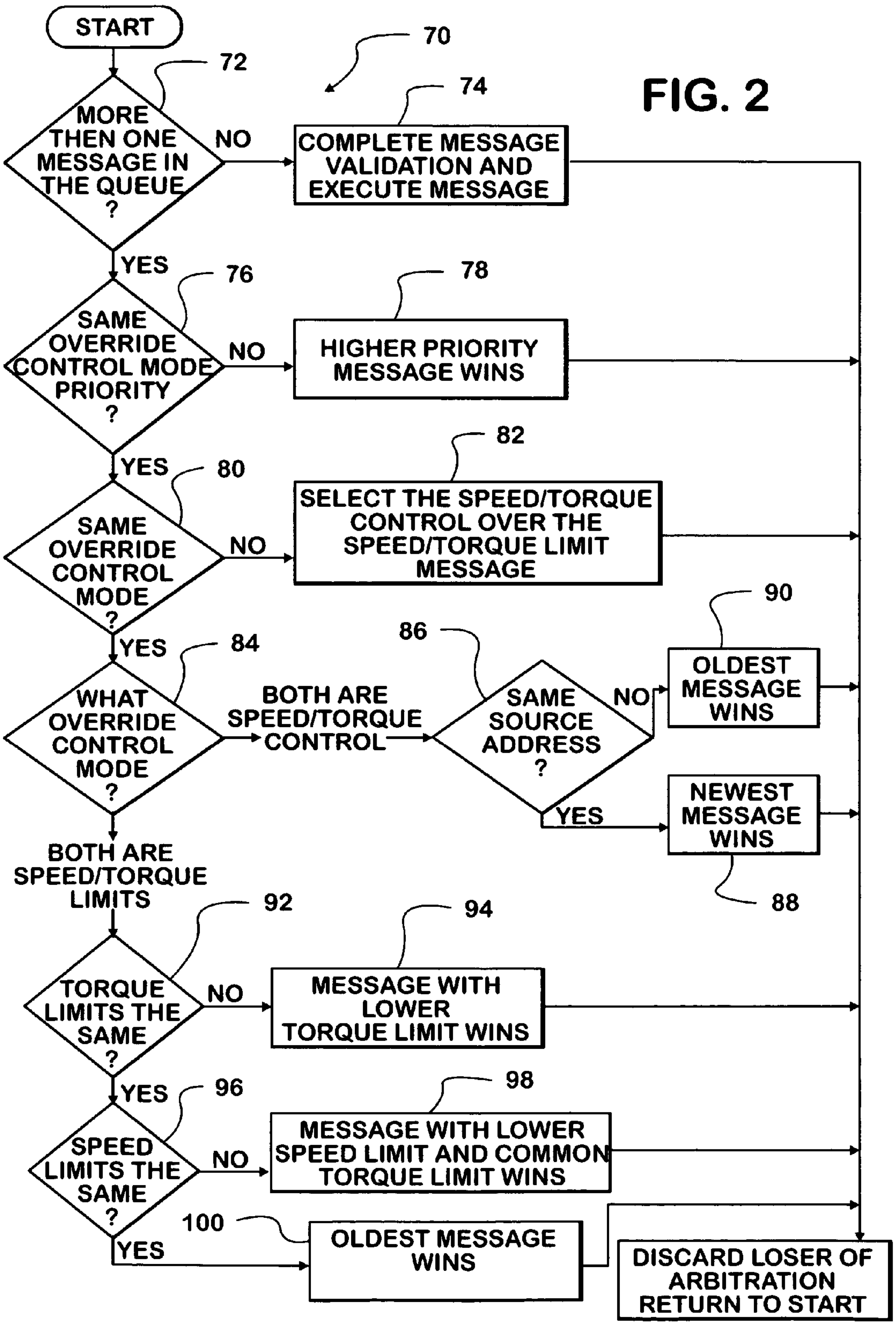
FIG. 2 is a flow diagram for selecting a particular message from one of multiple external sources in a motor vehicle in accordance with a current SAE (Society of Automotive Engineers) standard.

The inventive strategy disclosed in FIG. 2 is embodied principally in a TORQUE SPEED CONTROL portion 54 that forms an interface between certain portions on the left and certain portions on the right. The portions on the left are, in addition to all-speed GOVERNOR strategy 52: a CAN PARAMETER MESSAGES portion 56; a PROGRAMMABLE PARAMETERS portion 58; a TORQUE CALCULATOR portion 60; a CAMP SIGNAL PROCESSING portion 62. The portions on the right are: TORQUE CALCULATOR portion 60; a FUEL LIMITER portion 64; a FUEL PULSEWIDTH COMMAND portion 66; and an ENGINE SPEED SETPOINT portion 68.

CAN PARAMETER MESSAGES portion 56 represents certain data and/or data messages that are present on a data link or data bus through which various devices, components, and systems in the vehicle electronically communicate. Data or messages for only certain parameters are utilized by TORQUE SPEED CONTROL portion 54. The four parameters shown in FIG. 1 are: CAN_TSC_OCM; CAN_TSC_OCM_SA11; CAN_MAXMOT_P7; CAN_MAXMOT_LMT.

CAN_TSC_OCM represents data from any external source other than a source SA11. CAN_TSC_OCM_SA11 represents data from source SA11. CAN_MAXMOT_P7 represents data corresponding to a maximum allowable overspeed; CAN_MAXMOT_LMT represents data corresponding to a maximum allowable time limit for overspeed.

PROGRAMMABLE PARAMETERS portion 58 represents parameters that are programmed into the engine control system for the particular engine model in the vehicle. The three parameters shown are: TRXC_EN[PP]; N_HIIDLE[PP]; and N_LIDLE[PP]. TRXC_EN[PP] represents data for enabling or unenabling traction control; N_HIIDLE[PP] represents data for enabling or unenabling high idle; and N_LIDLE[PP] represents data defining low idle speed.

TORQUE CALCULATOR portion 60 processes certain data to develop a data value for desired fuel for delivering requested torque MF_RQST_TRQ. CAMP SIGNAL PROCESSING 62 provides a data value for engine speed N. GOVERNOR portion 52 provides a data value for MFGOV representing governor-commanded mass fuel that is determined by FUEL LIMITER portion 64 processing certain data.

FUEL LIMITER portion 64, FUEL PULSEWIDTH COMMAND portion 66, and a ENGINE SPEED SETPOINT portion 68 are present in the control system to set a limit on engine fueling, to set the amount of fuel injected (subject to limiting by portion 64), and to set engine speed, respectively.

TORQUE CALCULATOR portion 60, FUEL LIMITER portion 64, FUEL PULSEWIDTH COMMAND portion 66, and ENGINE SPEED SETPOINT portion 68 are essentially conventional in certain engine control systems of International Truck & Engine Corporation. They are however adapted for proper interaction with TORQUE SPEED CONTROL portion 54, as will be apparent from the present disclosure.

Source SA11, mentioned above, represents an ABS system in the vehicle. Other sources may also be present in the vehicle. The presence of such sources and data messages from them are made known to TORQUE SPEED CONTROL portion 54 via CAN PARAMETER MESSAGES portion 56.

Because messages can originate at one or more of multiple sources, it becomes appropriate to assign priority to the messages. Priority assignment is performed by processing that is conducted in accordance with a flow diagram 70 shown in FIG. 2.

Flow diagram 70 embodies SAE Standard J1939/71 adapted for particular application to the present invention where a motor vehicle may have either a single or multiple external sources that can influence engine torque in certain situations where engine fueling should be different from that which would otherwise be commanded by the all-speed governing strategy.

A detailed discussion of FIG. 2 is believed unnecessary because flow diagram 70 is basically self-explanatory. As each message is given, it is queued and processed in sequence. Step 72 determines if there is more than one message in the queue. If not, the single message is validated and processed (step 74).

If there is more than one message in the queue, step 76 determines if one has a higher priority than any other. If so, that one is validated and processed (step 78). If not, a step 80 determines if they seek the same control mode, either a speed-torque control mode or speed-torque limit mode.

If they do not seek the same control mode, a speed-torque control message is favored over a speed-torque limit message, and so a step 82 selects the former type of message for processing by TORQUE SPEED CONTROL portion 54. If they do seek the same control mode, a step 84 distinguishes one type from the other.

If the messages are speed-torque messages, a step 86 determines if they are from the same source. If they are, a step 88 selects the newest message for processing by TORQUE SPEED CONTROL portion 54. If they are not, a step 90 selects the oldest message for processing by TORQUE SPEED CONTROL portion 54.

If step 84 determines that the messages are speed-torque limit messages, then a step 92 determines if they have the same torque limit. If not, a step 94 selects the one with the lower limit for processing. If they are, a step 96 determines if the messages have the same speed limit. If they do not, then a step 98 selects the one with the lower speed limit for processing by TORQUE SPEED CONTROL portion 54. If they do, then a step 100 selects the oldest one for processing by TORQUE SPEED CONTROL portion 54.

A message typically comprises a packet of data. One data element in a packet signifies that the particular source is sending a message. Another data element distinguishes the particular type of message, and still another element designates a data value for Requested Torque. Torque Calculator portion 60 translates the externally requested torque into the desired fuel for delivering requested torque MF_RQST_TRQ. When TORQUE SPEED CONTROL portion 54 has control authority, the engine control system is operating in one of two modes, referred to in the present example as Mode 2 and Mode 3.

Mode 2 is a mode of operation where TORQUE SPEED CONTROL portion 54 is calling for fueling that will provide a specific engine torque. Mode 3 is a mode of operation where TORQUE SPEED CONTROL portion 54 is calling for fueling that will limit engine torque to some maximum value. Hence, when the type of message issued by an external source is a torque control message, the control system is operating in Mode 2, and when the type of message issued by an external source is a torque limiting message, the control system is operating in Mode 3.

Two other modes are Mode 0 and Mode 1. Mode 0 is an operating mode where the standard engine control, i.e. the accelerator pedal that is operated by the driver to provide an input to the engine control system through APS 24, has control authority. MFGOV represents the desired fueling when the accelerator pedal has control authority. Any other mode is an override mode where authority is given to a portion or portions of the strategy that can override the APS input. Mode 1 is a speed control mode that is independent of the strategy represented by Modes 2 and 3.

Figure 3A:
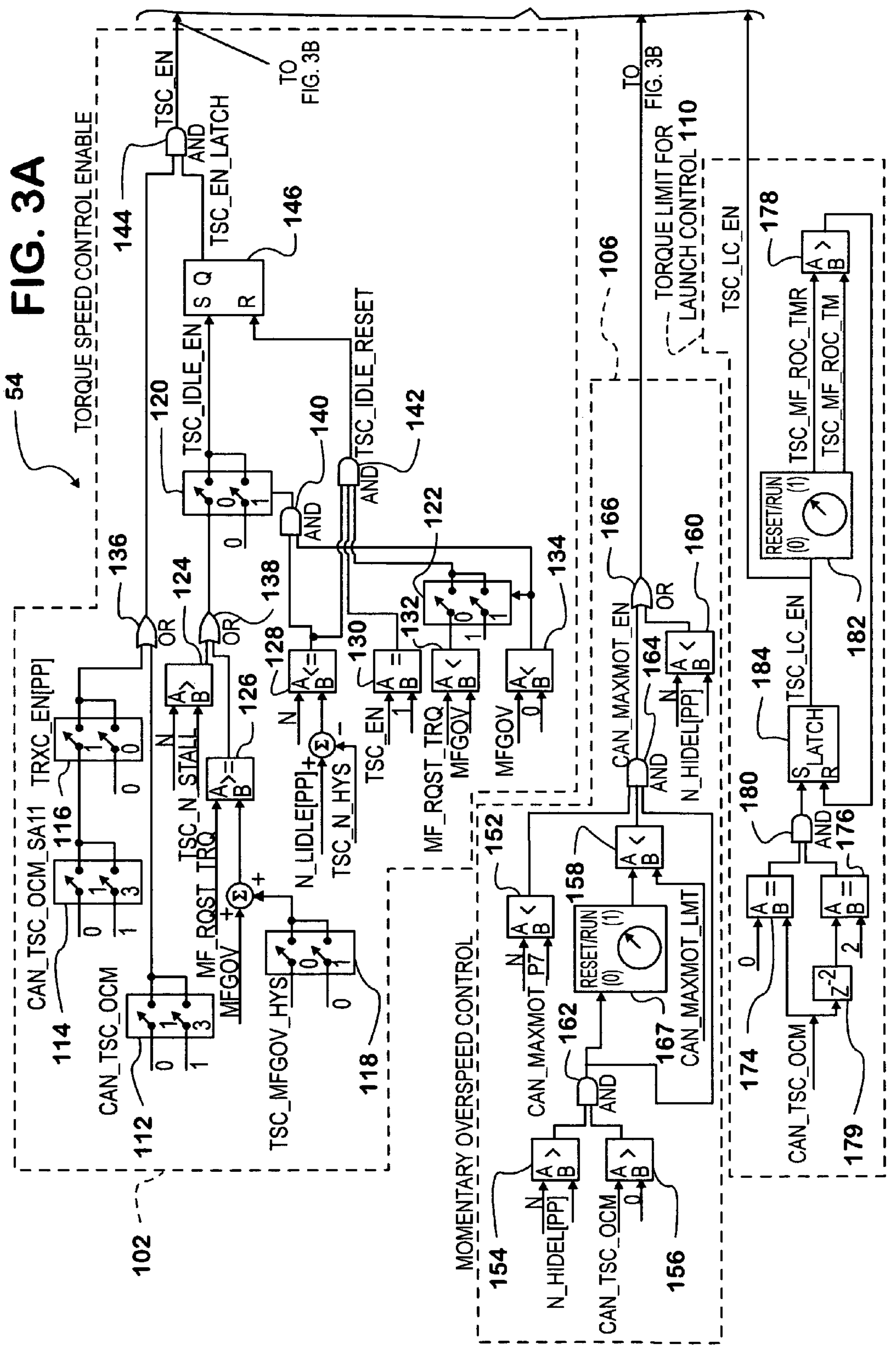
FIGS. 3A and 3B comprise a detailed software strategy diagram that discloses the inventive principles.
Figure 3B:
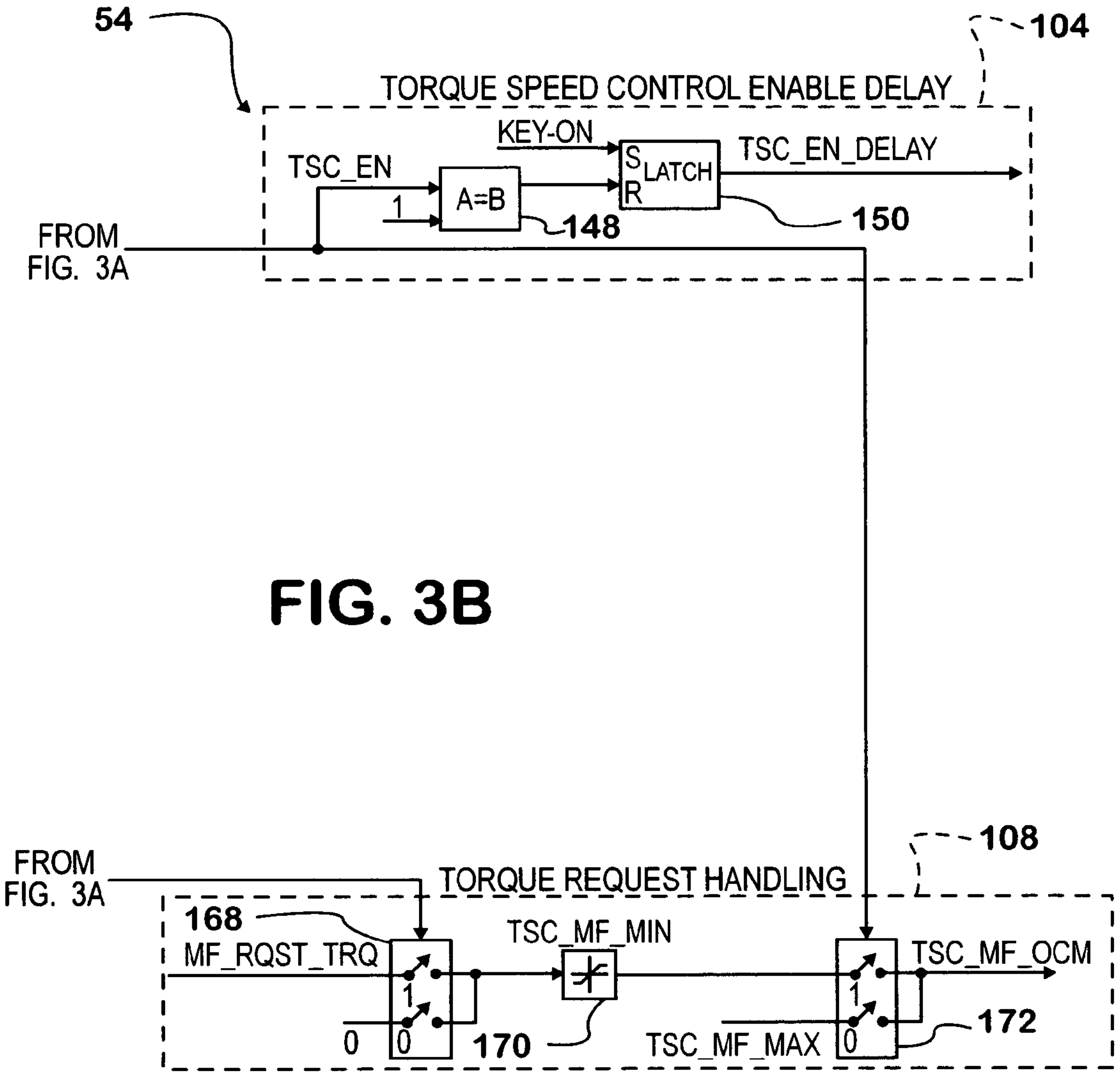

FIGS. 3A and 3B show that TORQUE SPEED CONTROL portion 54 is organized into a Torque Speed Control Enable portion 102, a Torque Speed Control Enable Delay portion 104, a Momentary Overspeed Control portion 106, a Torque Request Handling portion 108, and a Torque Limit For Launch Control portion 110.

Torque Speed Control Enable portion 102 comprises switch functions 112, 114, 116, 118, 122, 120; comparison functions 124, 126, 128, 130, 132, 134; OR logic functions 136, 138; AND logic functions 140, 142, 144; and a latch function 146.

Torque Speed Control Enable Delay portion 104 comprises a comparison function 148 and a latch function 150.

Momentary Overspeed Control Portion 106 comprises comparison functions 152, 154, 156, 158, and 160; AND logic functions 162, 164; an OR logic gate 166, and a timer function 167.

Torque Request Handling portion 108 comprises a switch function 168, a limiting function 170, and a switch function 172.

Torque Limit For Launch Control portion 110 comprises comparison functions 174, 176, and 178, a store function 179, an AND logic function 180, a timer function 182 and a latching function 184.

AND logic function 144 in Torque Speed Control Enable portion 102 provides a data output TSC_EN for enabling and unenabling torque speed control. When the data value for TSC_EN is a logic "1", torque speed control is enabled, and when the data value is a logic "0", torque speed control is unenabled. The data value for TSC_EN is determined by two data values: the data value TSC_EN_LATCH provided by latch function 146; and the data value provided by OR logic function 136.

OR logic function 136 provides a logic "1" output based on data messages from external sources that include source SA11 and any other external sources. When the vehicle is equipped with traction control, switch function 116 is set to ON, allowing one element of a data message from source SA11 (ABS system) to act as an input to OR logic function 136. That element of the data message can be either a logic "0" signifying that the source is not issuing a torque request or a logic "1" signifying that the source is issuing a torque request. Switch function 114 determines whether a torque request message is being issued by source SA11.

The other input to OR logic function 136 comes from the other external sources. That input, which can be either a logic "0" signifying that the source is not issuing a torque request or a logic "1"signifying that the source is issuing a torque request , is provided by switch function 112. Any logic "1" input to OR logic function 136 is effective to allow torque speed control to be enabled. But torque speed control will be enabled only if certain other conditions have caused latch function 146 to be set.

Those conditions involve parameters N, TSC_N_STALL, MF_RQST_TRQ, MFGOV, and TSC_MFGOV_HYS. Switch function 120 is enabled to set latch function 146 when switched ON. It will do so however only if data values for N, TSC_N_STALL, MF_RQST_TRQ, MFGOV, and TSC_MFGOV_HYS are such that OR logic function 138 provides a logic "1" to switch function 120. OR logic function 138 can provide a "1" logic output either while engine speed N is greater than a speed below which the engine will stall, or while MF_RQST_TRQ is greater than or equal to MFGOV, assuming that switch function 118 is ON. (How switch function 118 works will be explained later.)

Switch function 120 is switched ON and OFF by AND logic function 140. For torque speed control to be enabled, switch function 120 must be OFF, a condition that occurs only when the output of AND logic function 140 is logic "0". AND logic function provides a logic "1" output only both when MFGOV is less than some defined value as determined by comparison function 134 and when engine speed N is less than low idle speed N_LIDLE[PP].

What this means in essence is that once the engine has started running with all-speed governing in control of engine fueling, latch function 146 becomes set, thereby making it possible to enable torque speed control. But torque speed control will be enabled only if one of the external sources calls for it to be enabled. If multiple sources call for it to be enabled, the particular source that is allowed to set the data value for (MF_RQST_TRQ is determined by the priority determination processing of FIG. 2.

Once latch function 146 has been set, it can be reset only by another set of conditions. AND logic function 142 is used to reset latch function 146. Switch function 122 and comparison functions 128, 130 control AND logic function 142. Switch function 122 is under the control of comparison function 134.

Once torque speed control has been enabled, comparison function 130 provides a logic "1" input to AND logic function 142. Should engine speed drop below low idle speed, comparison function 128 will also provide a logic "1" input. And if switch function 122 is ON, by virtue of comparison function 134 indicating that MFGOV is above some predetermined value, it too will provide a logic "1" input. This means that torque speed control will be unenabled should engine speed fall below low idle speed. Control of fueling will then be restored to Governor portion 52 for restoring fueling to avoid engine stalling. Even if MFGOV is below the predetermined value for turning switch function 122 ON, the switch function will be turned ON if MFGOV exceeds MF_RQST_TRQ. With stalling having been avoided by discontinuance of torque speed control, a restoration of conditions favorable for torque speed control will cause latch function 146 to be set, thereby making it possible for torque speed control to be once again enabled when an external source calls for such enablement.

With torque speed control enabled, Torque Speed Control portion 54 acquires control of engine fueling from Governor portion 52. In now controlling engine fueling, Torque Speed Control portion acts via Torque Request Handling portion 108.

The enablement of torque speed control turns switch function 172 in Torque Request Handling portion 108 from OFF to ON. With switch function 168 in Torque Request Handling portion 108 OFF, the data value for TSC_M-

F_OCM becomes the minimum value TSC_MF_MIN set by limiting function 170 with the intent of reducing fueling to a level that is slightly that at which the engine would stall due to insufficient fueling. If MF_RQST_TRQ does not exceed that minimum TSC_MF_MIN, then the data value for TSC_MF_OCM is that of TSC_MF_MIN.

TSC_MF_OCM provides an input to FUEL LIMITER portion 64, which has been adapted to accord priority to TSC_MF_OCM in limiting fueling. TSC_MF_OCM also provides an input to FUEL PULSEWIDTH COMMAND portion 66, which has been adapted to utilize it in determining proper pulse widths for fuel injection pulses in the fuel limiting process.

By making TSC_EN an input to both FUEL PULSEWIDTH COMMAND portion 66 and ENGINE SPEED SETPOINT portion 68, both portions are apprized of torque speed control enablement for now processing data according to any portions of their respective strategies that are peculiar to torque speed control.

During torque speed control enablement, Momentary Overspeed Control portion 106 serves to honor torque requests from an external source that could increase engine speed above high idle speed. Overspeed is allowed only for short times and the overspeed is limited to a maximum speed. One example of how this feature may be used involves assisting transmission downshifts during motoring conditions. Momentary Overspeed Control portion 106 accomplishes this by control of switch function 168.

Instead of TSC_MF_OCM being forced to TSC_MF_MIN, the operation of switch function 166 from OFF to ON allows MF_RQST_TRQ to set the value for TSC_MF_OCM.

If engine speed is less than high idle speed as determined by comparison function 160, OR logic function 166 allows Momentary Overspeed Control portion 106 to turn switch function 168 ON. Once engine speed exceeds high idle speed, OR logic function will turn switch function 168 OFF unless AND logic function 164 acts to keep the switch function ON.

AND logic function 164 will keep switch function 168 ON for a limited time, as set by the collective effect of functions 167, 158, provided that engine speed continues to exceed high idle speed, as determined by comparison function 154, and that one of the external sources is continuing to call for torque speed control authority, as determined by comparison function 156. Engine speed must also not exceed a maximum limit, as determined by comparison function 152.

Torque Speed Control Enable Delay portion 104 serves to delay enablement of torque speed control until the first call for enablement of torque speed control after the all-speed governor has acquired control authority. Operation of the ignition switch to start the engine causes latch function 150 to be set. The setting of latch function 150 turns on switch function 118 in Torque Speed Control Enable portion 102 so that comparison function 126 compares whatever the data value is for MF_RQST_TRQ with the data value for MFGOV. Once the data value for TSC_EN changes from "0" to "1", comparison function 148 resets latch function 150 to cause the data value for TSC_EN_DELAY to switch back to "0" thereby turning switch function 118 off.

With switch function 118 now off, the data value for a parameter TSC_MFGOV_HYS is added to the data value for MFGOV so that comparison function 126 now compares the data value for MF_RQST_TRQ with the data value for the sum of the data values for MFGOV and TSC_MFGOV_HYS. Comparison function 126 will continue to compare in this way until the ignition switch is turned off to shut down the engine and once again turned on when the engine is once again started. The inclusion of TSC_MFGOV_HYS imparts a certain hysteresis that assures that desired fuel calculated from the external torque request is great enough to prevent the logic from cycling between accelerator and the external controls, which could cause fluctuations in engine torque. Torque Limit For Launch Control portion 110 acts only when the mode changes from Mode 2 to Mode 0, representing a change from torque control to driver control. Store 179, comparators 174, 176 and AND logic function 180 are arranged to detect that change, which is represented by the data value for CAN_TSC_OCM changing from "2" to "0", and when they do, AND logic function 180 sets latch function 184. As a consequence, the output TSC_LC_EN of latch function 184 changes from a "0" to a "1".

A transition from Mode 2 to Mode 0 occurs at vehicle launch, and may be triggered by the action of certain automatic transmissions that invoked Mode 2 operation at incipient launch. At some point in the launch, the transmission accedes control back to the driver, and that is when the mode reverts to Mode 0.

The setting of latch function 184 starts timer function 182 and also signals FUEL PULSEWIDTH COMMAND portion 66. The latter now acts to apply a rate-of-change limiting function to fueling that is being requested by the driver by virtue of Mode 0 operation. The purpose in doing this is to assure that at the point in vehicle launch where the transmission returns control to the driver, the driver is not requesting fueling that would impair the quality of the launch.

Once timer function 182 has timed out, comparison function 178 resets latch function 184, and it in turn resets timer function 182 and also returns TSC_LC_EN to "0". FUEL PULSEWIDTH COMMAND portion 66 is then allowed to discontinue applying rate-of-change limiting to engine fueling.

Principles of the invention can apply to vehicle platforms that have transmissions directly driven by diesel engines and to hybrid platforms where a DC motor may propel the vehicle and the engine will act as a battery charger to charge batteries that operate the DC motor. In such a hybrid vehicle, torque speed control can still be used to prevent the hybrid controller from stalling the engine.

While a presently preferred embodiment of the invention has been illustrated and described, it should be appreciated that principles of the invention apply to all embodiments falling within the scope of the following claims.

What is claimed is:

1. Apparatus comprising:

an internal combustion engine having a fueling system for fueling the engine;

one or more sources providing data relevant to operations of one or more systems of the apparatus that are external to the engine but potentially influential on fueling of the engine; and an engine control system comprising a processor for processing data according to an all-speed governing strategy for controlling the fueling system to develop all-speed governed fueling data that sets engine fueling when a data input to the engine control system from the one or more sources discloses no need to influence engine fueling, but when the data input from such one or more sources discloses a need to influence engine fueling, that data input causes engine fueling to be set by a strategy other than the all-speed governing strategy.

2. Apparatus as set forth in claim 1 wherein the apparatus comprises a wheeled land vehicle that is propelled by the engine, and the one or more sources provide data relevant to operations of one or more systems that act on wheels of the land vehicle.

3. Apparatus as set forth in claim 2 wherein the one or more sources provide data relevant to operations of one or more of: an ABS system; a traction control system; and a transmission through which the engine drives driven ones of the wheels of the vehicle.

4. Apparatus as set forth in claim 1 wherein the control system comprises functions for placing the other strategy in an enabled state when the data values for one set of inputs indicate the existence of conditions appropriate for the other strategy to influence engine fueling and for placing the other strategy in an unenabled state when the data values for another set of inputs indicate the existence of conditions inappropriate for the other strategy to influence engine fueling.

5. Apparatus as set forth in claim 4 wherein the one set of inputs includes engine speed.

6. Apparatus as set forth in claim 4 wherein the one set of inputs includes engine torque requested from one of the one or more sources and torque requested by the all-speed governing strategy.

7. Apparatus as set forth in claim 6 wherein the one set of inputs includes engine speed.

8. Apparatus as set forth in claim 4 wherein the other set of inputs includes engine speed and engine low idle speed, engine torque requested from one of the one or more sources, and torque requested by the all-speed-governing strategy.

9. Apparatus as set forth in claim 4 wherein the other strategy includes a momentary overspeed control portion that, when the other strategy is enabled, is effective to allow engine speed to exceed high idle speed for a limited time.

10. Apparatus as set forth in claim 9 wherein inputs to the momentary overspeed control portion include engine speed, engine high idle speed, a maximum speed limit, and a maximum time limit.

11. Apparatus as set forth in claim 1 wherein with the strategy other than the all-speed governing strategy influencing engine fueling, that other strategy functions to detect incipient engine stalling and change engine fueling to avoid actual stalling.

12. Apparatus as set forth in claim 1 wherein the strategy other than the all-speed governing strategy influencing engine fueling comprises a torque speed control strategy influencing engine fueling to influence engine torque.

13. Apparatus as set forth in claim 12 wherein the torque speed control strategy influencing engine fueling to influence engine torque comprises influencing engine fueling to create desired engine torque.

14. Apparatus as set forth in claim 12 wherein the torque speed control strategy influencing engine fueling to influence engine torque comprises influencing engine fueling to impose a limit on engine torque.

15. Apparatus as set forth in claim 1 wherein the data from the one or more sources comprises messages that include data indicative of message priority, and the processor processes the priority data in the messages according to an algorithm that prioritizes the messages.

16. An engine control system for apparatus that includes an internal combustion engine having a fueling system for fueling the engine and one or more sources providing data relevant to operations of one or more systems of the apparatus that are external to the engine but potentially influential on fueling of the engine, the engine control system comprising:

a processor for processing data according to an all-speed governing strategy for controlling the fueling system to develop all-speed governed fueling data that sets engine fueling when a data input to the engine control system from the one or more sources discloses no need to influence engine fueling, but when the data input from such one or more sources discloses a need to influence engine fueling, that data input causes engine fueling to be set by a strategy other than the all-speed governing strategy.

17. An engine control system as set forth in claim 16 comprising functions for placing the other strategy in an enabled state when the data values for one set of inputs indicate the existence of conditions appropriate for the other strategy to influence engine fueling and for placing the other strategy in an unenabled state when the data values for another set of inputs indicate the existence of conditions inappropriate for the other strategy to influence engine fueling.

18. An engine control system as set forth in claim 17 wherein the one set of inputs includes engine speed.

19. An engine control system as set forth in claim 17 wherein the one set of inputs includes engine torque requested from one of the one or more sources and torque requested by the all-speed governing strategy.

20. An engine control system as set forth in claim 19 wherein the one set of inputs includes engine speed.

21. An engine control system as set forth in claim 17 wherein the other set of inputs includes engine speed and engine low idle speed, engine torque requested from one of the one or more sources, and torque requested by the all-speed-governing strategy.

22. An engine control system as set forth in claim 17 wherein the other strategy includes a momentary overspeed control portion that, when the other strategy is enabled, is effective to allow engine speed to exceed high idle speed for a limited time.

23. An engine control system as set forth in claim 22 wherein inputs to the momentary overspeed control portion include engine speed, engine high idle speed, a maximum speed limit, and a maximum time limit.

24. An engine control system as set forth in claim 16 wherein with the strategy other than the all-speed governing strategy influencing engine fueling, that other strategy functions to detect incipient engine stalling and change engine fueling to avoid actual stalling.

25. An engine control system as set forth in claim 16 wherein the strategy other than the all-speed governing strategy influencing engine fueling comprises a torque speed control strategy influencing engine fueling to influence engine torque.

26. An engine control system as set forth in claim 25 wherein the torque speed control strategy influencing engine fueling to influence engine torque comprises influencing engine fueling to create desired engine torque.

27. An engine control system as set forth in claim 25 wherein the torque speed control strategy influencing engine fueling to influence engine torque comprises influencing engine fueling to impose a limit on engine torque.

28. A motor vehicle comprising:

an internal combustion engine having a fueling system for fueling the engine;

one or more sources providing data relevant to operations of the vehicle that are external to the engine but potentially influential on fueling of the engine; and an engine control system comprising a processor for processing data according to an all-speed governing strategy for controlling the fueling system to develop all-speed governed fueling data that sets engine fueling when a data input to the engine control system from the one or more sources discloses no need to influence engine fueling, but when the data input from such one or more sources discloses a need to influence engine fueling, that data input causes engine fueling to be set by a strategy other than the all-speed governing strategy.

29. A motor vehicle as set forth in claim 28 wherein the vehicle comprises a transmission that is directly coupled to the engine for propelling the vehicle through a drivetrain ending at driven ones of wheels of the vehicle, and the one or more sources comprise one or more systems that act on at least some of wheels.

30. A motor vehicle as set forth in claim 29 wherein the one or more sources comprise one or more of: an ABS system; a traction control system; and the transmission.

31. A motor vehicle as set forth in claim 28 wherein the control system comprises functions for placing the other strategy in an enabled state when the data values for one set of inputs indicate the existence of conditions appropriate for the other strategy to influence engine fueling and for placing the other strategy in an unenabled state when the data values for another set of inputs indicate the existence of conditions inappropriate for the other strategy to influence engine fueling.

32. A motor vehicle as set forth in claim 31 wherein the one set of inputs includes engine speed.

33. A motor vehicle as set forth in claim 31 wherein the one set of inputs includes engine torque requested from one of the one or more sources and torque requested by the all-speed-governing strategy.

34. A motor vehicle as set forth in claim 33 wherein the one set of inputs includes engine speed.

35. A motor vehicle as set forth in claim 31 wherein the other set of inputs includes engine speed and engine low idle speed, engine torque requested from one of the one or more sources, and torque requested by the all-speed governing strategy.

36. A motor vehicle as set forth in claim 31 wherein the other strategy includes a momentary overspeed control portion that, when the other strategy is enabled, is effective to allow engine speed to exceed high idle speed for a limited time.

37. A motor vehicle as set forth in claim 36 wherein inputs to the momentary overspeed control portion include engine speed, engine high idle speed, a maximum speed limit, and a maximum time limit.

38. A motor vehicle as set forth in claim 28 wherein with the strategy other than the all-speed governing strategy influencing engine fueling, that other strategy functions to detect incipient engine stalling and change engine fueling to avoid actual stalling.

39. A motor vehicle as set forth in claim 28 wherein the strategy other than the all-speed governing strategy influencing engine fueling comprises a torque speed control strategy influencing engine fueling to influence engine torque.

40. A motor vehicle as set forth in claim 39 wherein the torque speed control strategy influencing engine fueling to influence engine torque comprises influencing engine fueling to create desired engine torque.

41. A motor vehicle as set forth in claim 39 wherein the torque speed control strategy influencing engine fueling to influence engine torque comprises influencing engine fueling to impose a limit on engine torque.

42. A motor vehicle as set forth in claim 28 wherein the data from the one or more sources comprises messages that include data indicative of message priority, and the processor processes the priority data in the messages according to an algorithm that prioritizes the messages.

43. A method for governing an internal combustion engine that forms one portion of an apparatus having one or more systems external to the engine and that has an engine control system that includes an accelerator position sensor, the engine having a fueling system that is under control of the engine control system, the method comprising:

governing the engine by processing data in the engine control system, including accelerator position sensor data, according to an all-speed governing strategy to set desired engine fueling free of influence by the one or more systems external to the engine;

governing the engine by processing data, including accelerator position sensor data, according a governing strategy other than the all-speed governing strategy to set desired engine fueling when the one or more systems external to the engine operate in a manner calling for interrupting the all-speed governing strategy.

44. A method as set forth in claim 43 wherein the strategy other than the all-speed governing strategy comprises a torque speed control strategy to set engine fueling for setting engine torque.

45. A method as set forth in claim 44 wherein the torque speed control strategy comprises setting engine fueling to create desired engine torque.

46. A method as set forth in claim 44 wherein the torque speed control strategy comprises setting engine fueling to impose a limit on engine torque.

* * * * *